United States Patent [19]
Voorhees et al.

[11] 3,808,912
[45] May 7, 1974

[54] ARRANGEMENT FOR DYNAMIC BALANCING OF A MECHANICAL PRESS, ESPECIALLY A HIGH SPEED MECHANICAL PRESS

[75] Inventors: John E. Voorhees, Sidney; Robert L. Schockman, St. Henry, both of Ohio

[73] Assignee: The Minster Machine Corporation Company, Minster, Ohio

[22] Filed: Nov. 21, 1972

[21] Appl. No.: 308,531

[52] U.S. Cl. .................................. 74/604, 100/282
[51] Int. Cl. ............................................ F16f 15/22
[58] Field of Search ...................... 74/604; 100/282; 123/192 B, 192 R

[56] References Cited
UNITED STATES PATENTS

| | | | |
|---|---|---|---|
| 2,808,736 | 10/1957 | Jackson | 74/604 |
| 2,914,963 | 12/1959 | Scherenberg | 74/604 |
| 2,914,964 | 12/1959 | Bensinger et al. | 74/604 |
| 3,450,038 | 6/1969 | Kraft et al. | 100/282 X |
| 3,457,804 | 7/1969 | Harkness | 74/604 |

*Primary Examiner*—Samuel Scott
*Assistant Examiner*—F. D. Shoemaker
*Attorney, Agent, or Firm*—Albert L. Jeffers; Roger M. Rickert

[57] ABSTRACT

A high speed mechanical press having a crankshaft, or two crankshafts, with a reciprocating slide driven thereby, and with off center masses in the press movable in unison with the press slide for counterbalancing the inertia forces developed by the reciprocating components of the press and the centrifugal forces developed on the crankshaft, or crankshafts, by off center masses acting thereon at the throw portions thereof.

13 Claims, 15 Drawing Figures

ARRANGEMENT FOR DYNAMIC BALANCING OF A MECHANICAL PRESS, ESPECIALLY A HIGH SPEED MECHANICAL PRESS

This invention relates to an arrangement for dynamic balancing a high speed press, and is particularly concerned with the dynamic balancing of a high speed mechanical press having a crankshaft, or a pair of crankshafts in the press crown connected to a reciprocating slide.

Mechanical presses are known, but many presses do not operate at such high speeds that serious forces of unbalance occur anywhere in the press structure. In presses operating at speeds of approximately 400 strokes per minute to as high as 1,600 strokes a minute, or more, forces of unbalance can reach substantial proportions. The slide of the press and the parts connected thereto reciprocate between a top dead center position and a bottom dead center position and develop substantial forces of unbalance due to inertia forces created by the movement of the reciprocating components.

Further, the slide is driven by a crankshaft, or by a pair of crankshafts, each of which has at least one throw portion and forces of unbalance can be created by eccentric mass disposed at each throw portion of a crankshaft or by mass so connected to the throw portions of the crankshaft as to be considered rotating therewith.

A primary object of the present invention is the provision of an arrangement for counterbalancing the aforementioned inertia and centrifugal forces of unbalance that can be created in a press arrangement of the nature referred to and, particularly, in connection with a high speed press.

A further object is the provision of a system for calculating the size and disposition of counterbalancing masses to produce the best dynamic conditions in respect of a high speed press of the nature referred to.

Still another object is the provision of an arrangement for counterbalancing presses in the manner referred to which can be adapted to existing presses.

These and other objects and advantages of the present invention will become more apparent upon reference to the following detailed specification taken in connection with the accompanying drawings in which.

Figure 1:
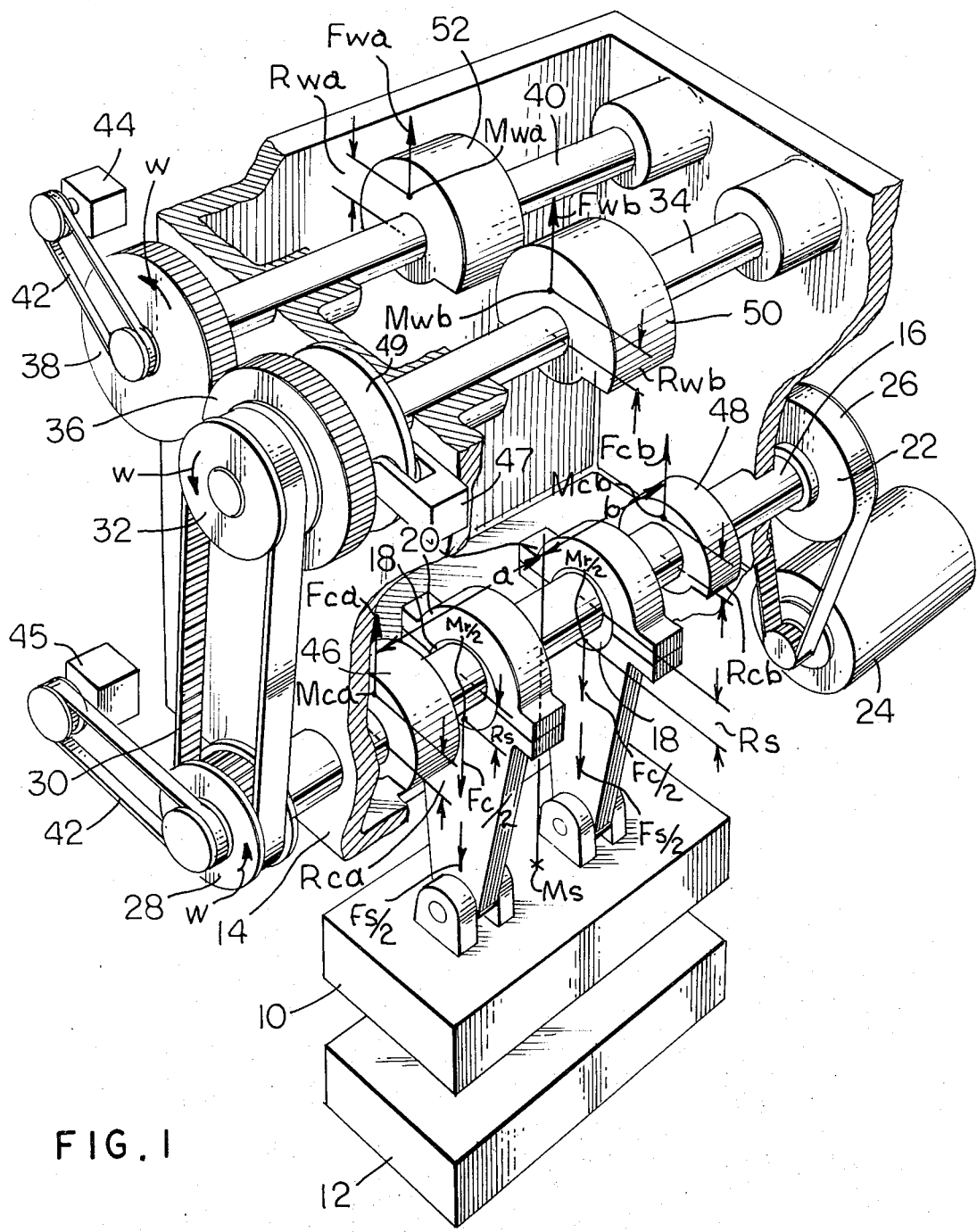
FIG. 1 is a schematic perspective view showing one embodiment of the present invention applied to a press having a single crankshaft and two counterweight shafts that rotate in opposite direction to one another.
Figure 7A:
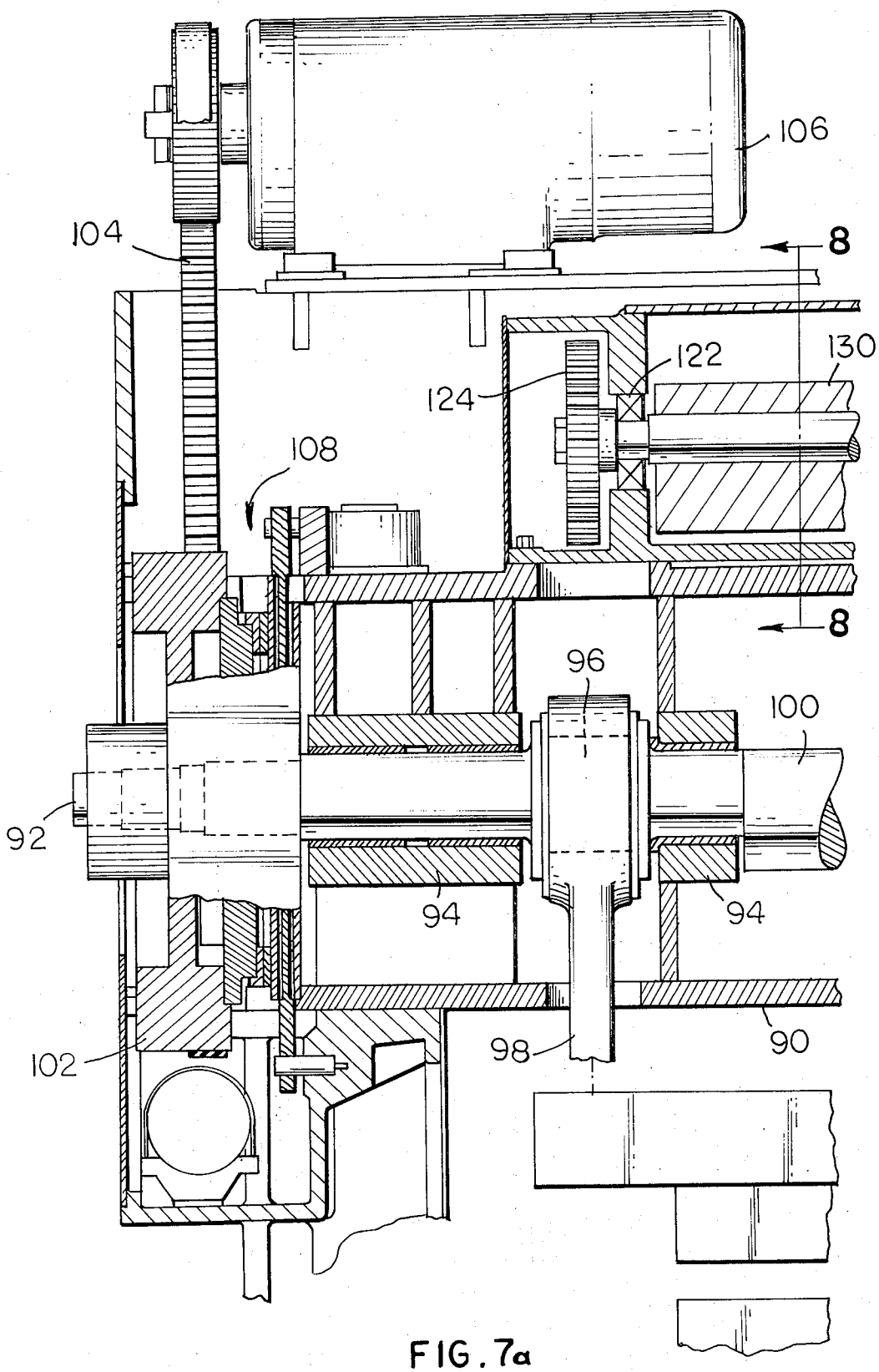
Figure 8:
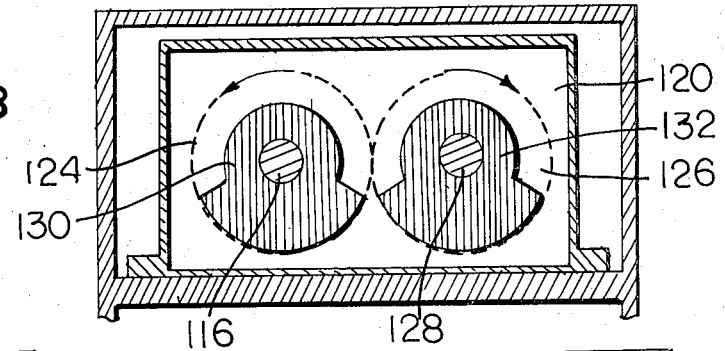
Figure 7B:
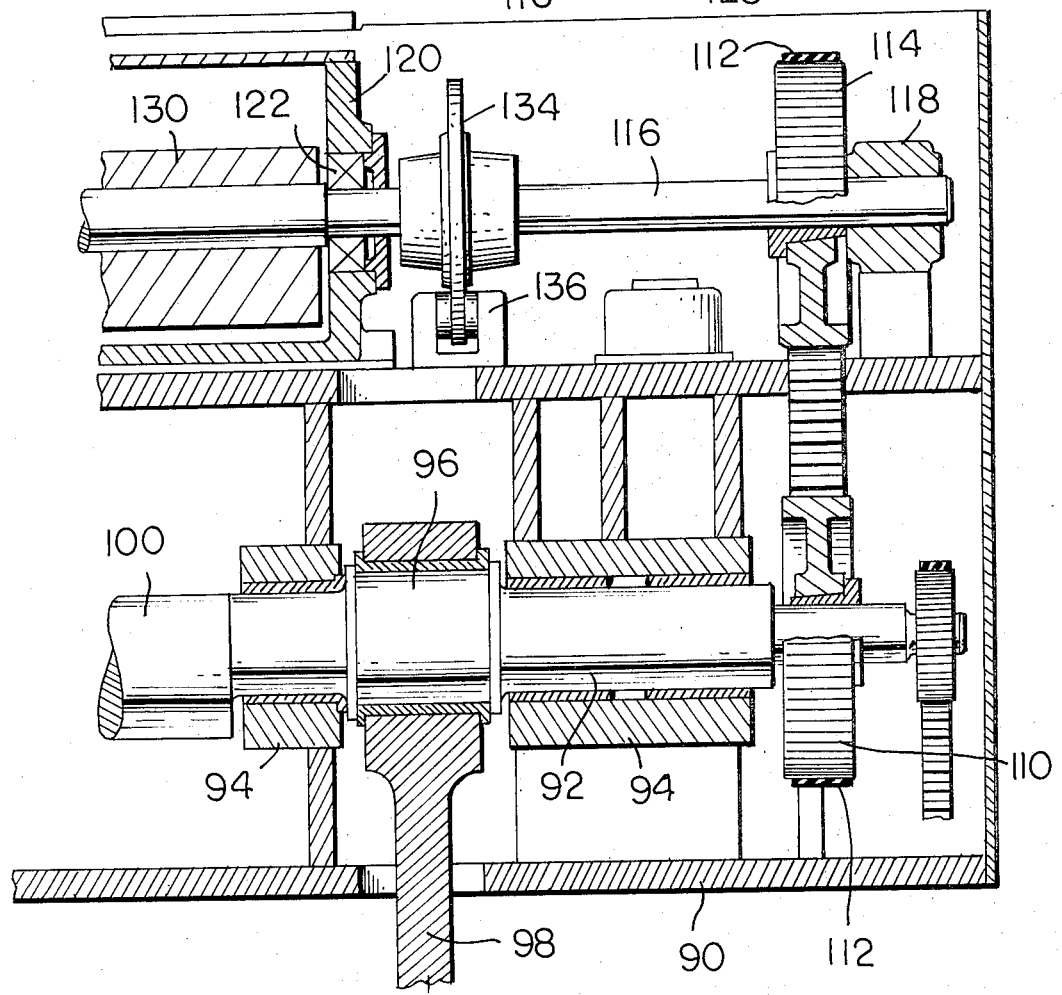
Figure 9:
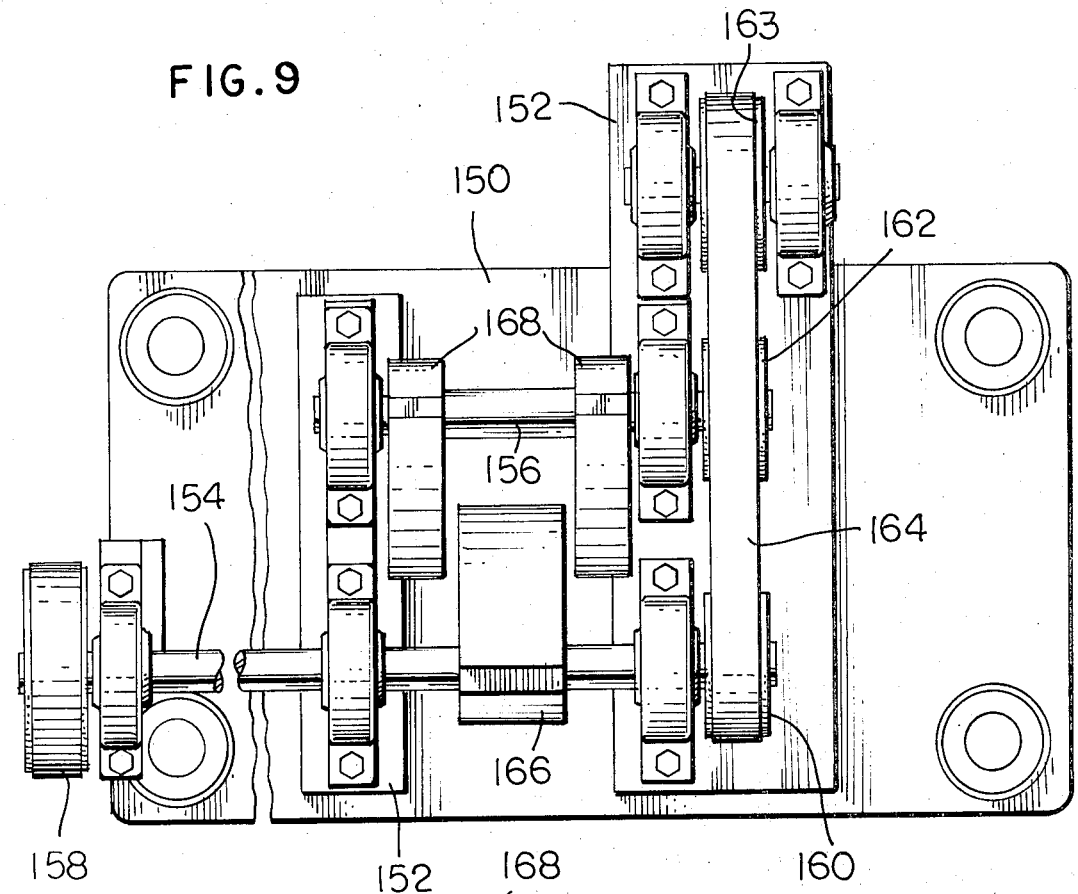
Figure 10:
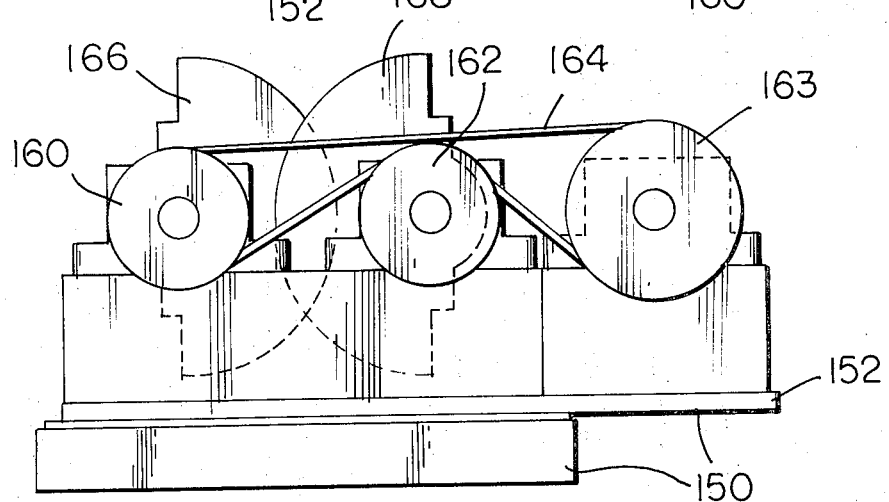
Figure 11:
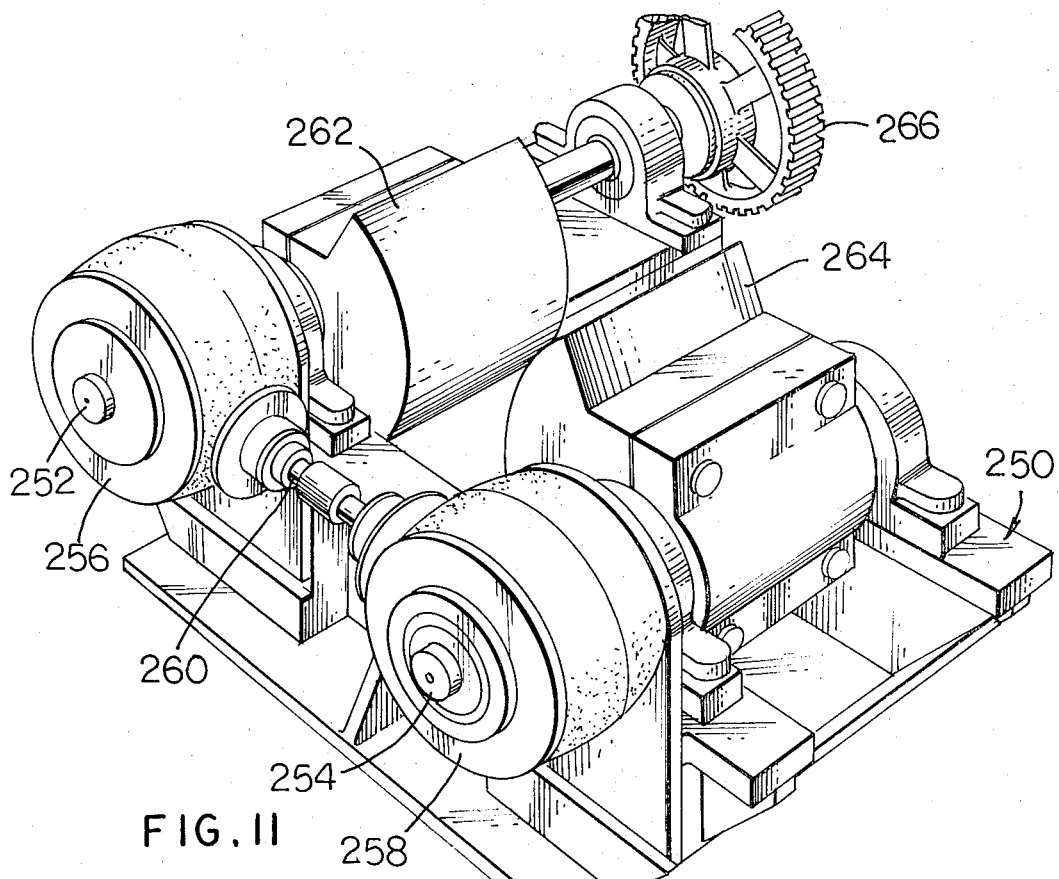
Figure 12:
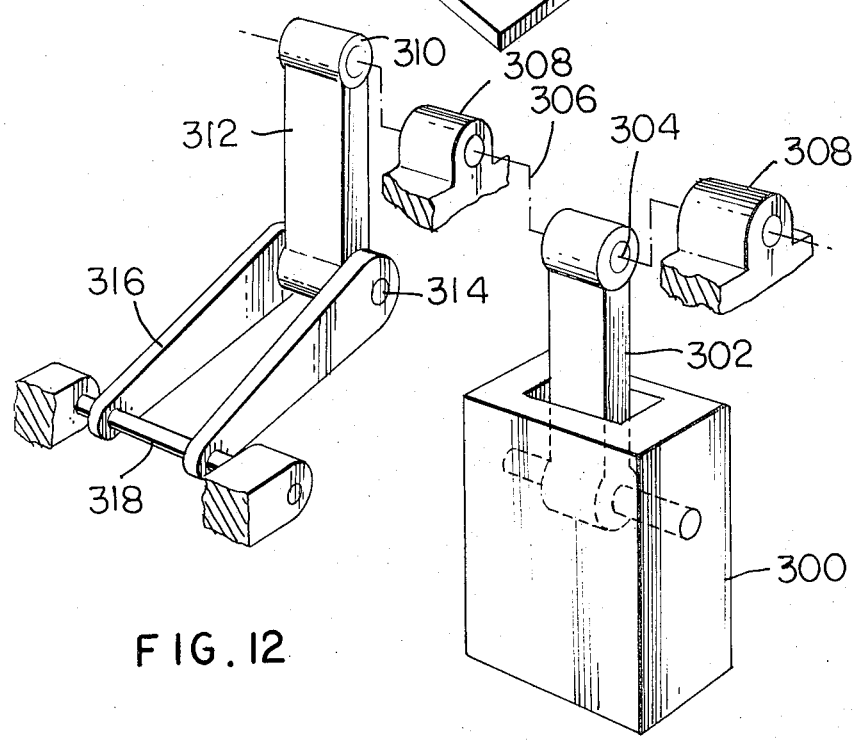
Figure 13:
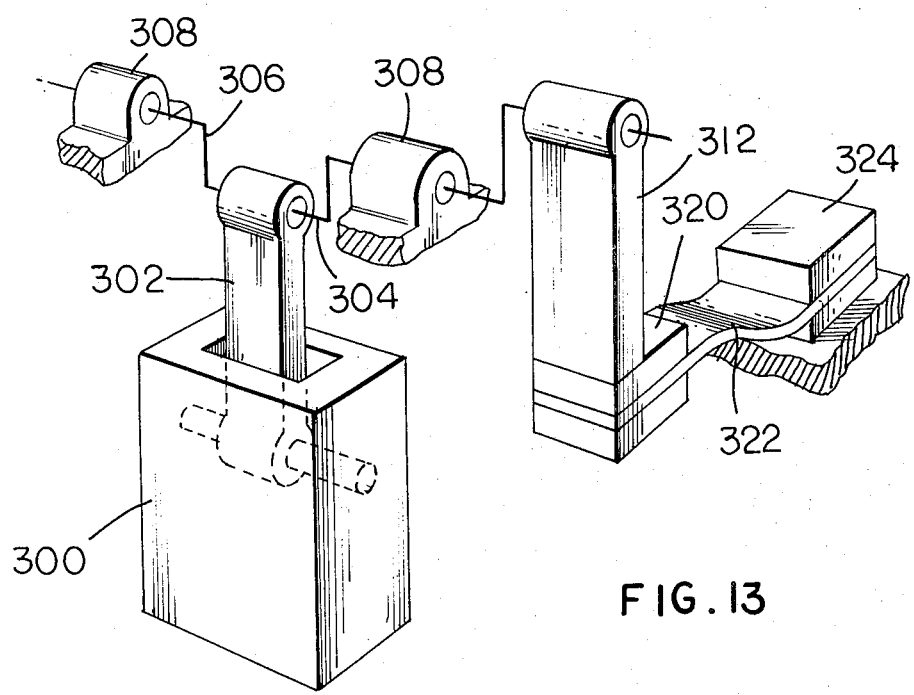
Figure 14:
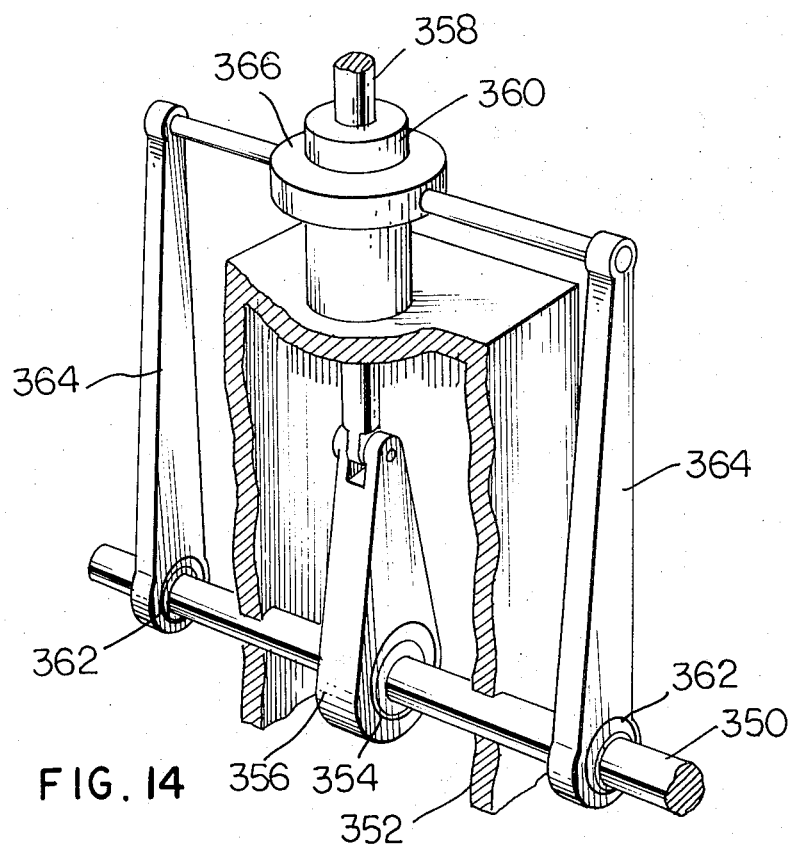

FIGS. 3 through 6 schematically show the slide of the press and the counterweights on the counterweight shafts illustrated in FIG. 1, in successively different positions during a press cycle;

FIGS. 7a and 7b are sectional views showing another arrangement of the present invention, in which the balancing unit is a sub-assembly contained within the press crown;

FIG. 8 is a sectional view indicated by line 8—8 on FIG. 7a;

FIG. 9 is a plan view looking down on top of another arrangement of a pair of counterbalancing shafts according to the present invention in which a positive belt or chain drive is used to provide opposite rotation of the two counterbalancing shafts;

FIG. 10 is an end view of the balancer of FIG. 9 showing the counterbalancing shafts and the driving connected therebetween;

FIG. 11 is a perspective view schematically illustrating how a pair of counterbalancing shafts could be connected by a gear drive to rotate in respectively opposite directions;

FIG. 12 is a fragmentary schematic view showing the manner in which counterweights could be operatively connected to a crankshaft and guided for oscillation during rotation of the crankshaft;

FIG. 13 is a view similar to FIG. 12 but shows a different manner of guiding the counterweights during oscillation thereof; and FIG. 14 is a schematic perspective view showing a manner in which a counterweight could be guided in reciprocation during rotation of the crankshaft of the system which the counterweight counterbalances.

BRIEF SUMMARY OF THE INVENTION

According to the present invention, a mechanical system has a reciprocating mass which is driven in reciprocation by one or more crankshafts. As shown in the drawings, the reciprocating mass is the slide of a mechanical press and the press frame in which the slide is guided has one or two crankshafts mounted therein and driven in rotation. Each crankshaft has at least one throw thereon, and each throw is connected to the slide by a connecting rod or Scotch yoke so that as the crankshaft, or crankshafts, are driven in rotation, the press slide will reciprocate.

According to the present invention, counterweights are provided which effectively dynamically balance the forces of unbalance which arise when the slide of the press is driven in reciprocation, particularly, when driven in reciprocation at high speed.

In one form which the invention takes, a pair of shafts are provided which rotate in respectively opposite directions and which have counterweights thereon. The shafts are journaled in the press frame in a plane perpendicular to the direction of reciprocation of the press slide, and the counterweights or off-center masses thereon develop forces on the press frame in the direction of reciprocation of the press slide and in an amount substantially to balance the inertia forces developed by the press slide as it reciprocates in the press frame.

In a second form of the invention two counterbalancing shafts are used, rotating in the same direction as one another but in a direction opposite to that of the crankshaft. Counterbalancing weights to develop a corrective force equal to about half the slide inertia force are carried on the crankshaft, while weights to provide a balance correction for the remaining part of the slide inertia force are distributed on the two counterbalancing shafts. Weights to correct the imbalance of the crankshaft itself and of the rotating portion of the connecting rod or Scotch yoke are carried on the crankshaft.

In another form which the invention takes, counter-rotating masses are provided on the crankshaft and consist of a pair of such masses on each side of the crankshaft throw, and one of each masses rotate with the crankshaft and the adjacent mass rotates in synchronism in the opposite direction. Each pair of masses develops inertia forces on the press frame parallel to the direction of reciprocation of the slide and in an amount that is substantially inversely proportional to their distance from the axis of reciprocation of the slide. The peak total value of the inertia forces developed by the four counterrotating masses is substantially equal and opposite of the peak value of slide inertia force for each cycle of press operation.

DETAILED DESCRIPTION OF THE INVENTION:

Referring to the drawings somewhat more in detail, in FIG. 1, 10 represents a press slide and 12 represents the press bed. Cooperating elements of a die set are adapted for being mounted on the underside of slide 10 and on the upperside of bed 12 to cooperate in operating workpieces as slide 10 reciprocates in the press frame. Slide 10 is guided in the press frame, the specific guiding means not being shown in the drawings. The press frame includes a crown portion 14 in which is rotatably mounted a crankshaft 16. Crankshaft 16 has throws 18, each connected by a respective connecting rod 20 with the slide 10. At one end of crankshaft 16 there is mounted a clutch brake arrangement 22 that receives power from a drive motor 24, as by the drive belt 26. Clutch-brake 22 is of a well known type and when the brake is engaged, crankshaft 16 is braked to crown 14 of the press frame and thereby held against rotation. At this time the clutch portion of the clutch-brake unit is disengaged. When, however, the brake is disengaged and the clutch is engaged, the crankshaft 16 is clutched to the belt 26 to be driven in rotation thereby. Advantageously, the unit at 22 includes a substantial fly-wheel mass on the motor side of the clutch which rotates continuously.

Shaft 16 also carries a pulley 28 that drives a belt 30 running over another pulley 32 which is the same size as pulley 28 and mounted on a counterbalance shaft 34. Counterbalance shaft 34 carries a gear 36 that meshes with another gear 38 of the same size and mounted on a second counterbalance shaft 40. The pulleys 28 and 32 are cogged timing pulleys and belt 30 is a cogged timing belt and because of this construction the shafts 34 and 40 rotate in synchronism with crankshaft 16.

A feature of this invention that is advantageous, though not essential in all applications, involves rotary switches 44 and 45, driven by positive drive means 42 from balance shaft 40 and crankshaft 16, respectively. The intermittent contacting occurring at each of these switches is so arranged that if the discrepancy in the angular position of one shaft relative to the other is greater than a predetermined amount clutch-brake unit 22 will be actuated to stop the press crankshaft. At the same time, auxiliary brake caliper unit 47 will be actuated to grip brake disk 49 and stop the balancer shafts.

Crankshaft 16 has a pair of off-center masses at 46 and 48 with the center of gravity thereof displaced from the axis of rotation of the crankshaft 16 in a direction directly opposite the displacement of the centers of gravity of throws 18 from the axis of the shaft.

Shaft 34 has a counterbalancing mass 50 thereon and shaft 40 has a counterbalancing mass 52 thereon. The centers of gravity of the off-center masses 50 and 52 are so positioned that when the crankshaft throws 18 are in the downward position, as illustrated in FIG. 1, the masses 50 and 52 are in the upper position thereof, while when the crankshaft throws are in the upper position thereof the masses 50 and 52 are in the lower positions thereof.

Figure 2:
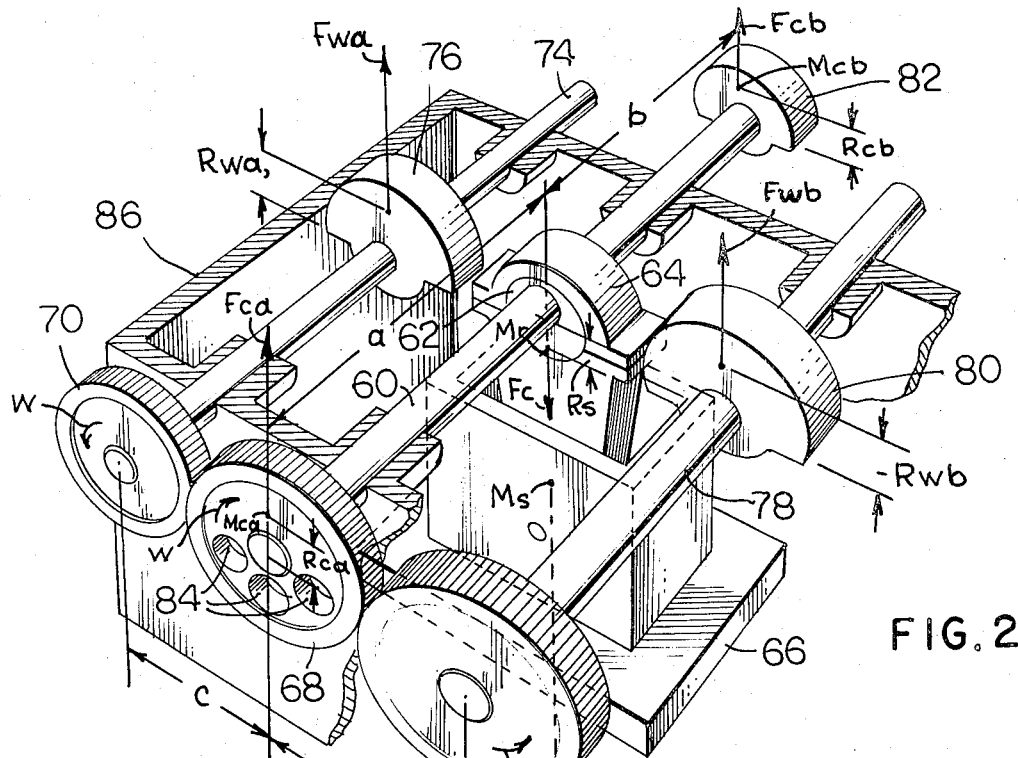
FIG. 2 is a view somewhat like FIG. 1, but shows a second embodiment of the invention in which the single crankshaft is gear connected to two parallel shafts that rotate in the same direction as one another but in a direction opposite to that of the crankshaft, and wherein the crankshaft and the counterbalancing shafts are in substantially coplanar relation.

FIG. 2 is a view similar to that of FIG. 1 in that it shows a single crankshaft 60 having a throw 62 thereon connected by connecting rod 64 with a slide 66. Crankshaft 60 has a gear 68 on one end that meshes with gears 70 and 72 arranged on opposite sides of gear 68 and of the same size. Gear 70 is connected to a counterbalance shaft 74 having an off-center mass 76 thereon, while gear 72 is connected to a counterbalance shaft 78 having an off-center mass 80 thereon.

Crankshaft 60 carries an off-center mass 82 which is opposed to throw 62 and gear 68 either carries an off-center mass oriented in the same manner as off-center mass 82 or is provided with drilled holes 84 therein which lighten the side of the gear on the same side as throw 62 thereby effectively concentrating the mass on side of the gear opposite throw 62. Crankshaft 60 and shafts 74 and 78 are journalled in the press frame and thus transfer the forces exerted thereon to the press frame. The press frame is schematically illustrated in FIG. 2 and is indicated by reference numeral 86. Slide 66 is guided for reciprocation in the press frame and a clutch-brake unit is interposed between crankshaft 60 and a driving motor therefor which is not shown in FIG. 2.

A basic difference between the arrangement of FIG. 2 and that of FIG. 1 is that, in FIG. 1 counterbalance shafts 34 and 40 rotate in respectively opposite directions, whereas in FIG. 2 counterbalance shafts 74 and 78 rotate in one and the same direction and in a direction opposite to that of the crankshaft.

Concerning the operation of the arrangement of FIG. 1, reference may be had to FIGS. 3 to 6. In FIG. 1, it will be understood that the off-center counterbalancing masses 46 and 48 on crankshaft 16 effectively counterbalance the off-center masses of throws 18 and that portion of the connecting rods 20 associated therewith that can be considered to rotate with the crankshafts. The mass of the slide and a certain portion of the mass of the connecting rods 20 can be considered to be reciprocating mass and the inertia forces developed thereby on the press frame are counterbalanced by the counter rotating counterweight masses 50 and 52 on shafts 34 and 40.

Figures 3, 4:
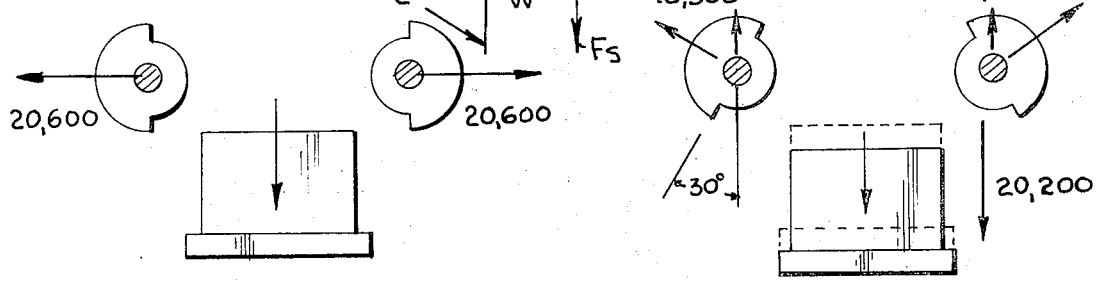
Figures 5, 6:
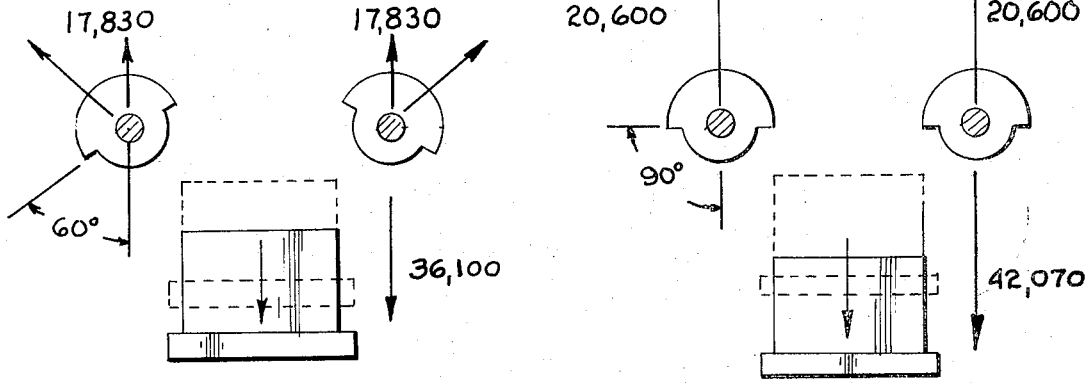

The schematic illustrations of FIGS. 3 to 6 show the counterbalance shafts and the masses thereon and also show the slide of the press, with FIG. 3 showing the slide in a position with the crankshaft 90° from bottom dead center and the counterweight shafts 90° from their top position and on the down stroke thereof and with FIG. 4 showing the slide moving down from its FIG. 3 position and with the counterbalance shafts rotated 30° from the FIG. 3 position thereof. In FIG. 5, the counterbalance shafts have rotated 6° and the slide is still further advanced toward bottom dead center. In FIG. 6, the slide has reached bottom dead center and the counterbalance shafts have rotated 90° from the FIG. 3 position thereof.

Purely by way of example, and assuming a particular set of press dimensions and a predetermined speed of rotation of the crankshaft, for example, 1,000 strokes per minute, the counterbalancing masses in the FIG. 3 position thereof each exert a radial force of unbalance on the respective shaft of 20,600 pounds. These forces are directed horizontally and in opposite directions and, thus, do not exert any forces on the press frame parallel to the direction movement of the press slide. The press slide at this time is in a condition of near zero acceleration and therefor develops a secondary inertia force of only 870 pounds on the press frame.

In FIG. 4, the forces developed by the counterweights in the vertical direction amount to 10,300 pounds each, representing a total of 20,600 pounds being exerted in the vertically upward direction. The slide at this time is traveling downward but is being accelerated in the upward direction as it approaches its lowermost position and thus develops a force of about 20,200 pounds inertia force on the press frane acting in the downward direction opposite to the direction of the force developed by the counterweights on the press frame.

In FIG. 5, the counterweights each develop a force in the vertically upward direction amounting to 17,830 pounds so a total of 35,660 pounds is developed by the counterweights acting upwardly on the press frame. The slide at this time develops a downward inertia force on the press frame in the amount of 36,100 pounds.

Finally, in FIG. 6, each counterweight develops a vertically upwardly directed force of 20,600 pounds, or a total of 41,200 pounds, acting upwardly on the press frame. The slide at this time is at a point of maximum acceleration and develops a downward force on the press frame in the amount of 42,070 pounds.

It will be appreciated from the foregoing that the inertia forces of the reciprocating portion of the press mass are substantially counterbalanced at all times during the press cycle. Only one-fourth of a press cycle has been referred to but it will be evident that similar force relationships will be developed during the remainder of the press cycle with the forces involved periodically reversing. The discrepancy from perfect balance correction is caused by the non-sinusoidal slide motion that results from the fact that a connecting rod is used instead of a Scotch yoke mechanism in the example shown. The discrepancy is a small percentage of the peak forces being counterbalanced, and is not a significant problem in practical presses. Use of the Scotch yoke instead of the connecting rod will eliminate even this small discrepancy.

FIGS. 1 and 2 have marked thereon forces, centers of mass, dimensions, and speeds of rotation which are employed in the manner demonstrated below for obtaining the proper balancing relationships.

$Ms$ — Total mass of reciprocating components (press slide and associated parts)

$Rs$ — Crank throw eccentricity $Fs$ — Peak value of the primary component of the total reciprocating slide inertia force $Fc$ — Centrifugal unbalance force developed by the rotating mass of the crank throw and the portion of the mass of the connecting rods that may be considered to rotate with the crankshaft $S$ — strokes of press slide $Mr$ — The mass of the crank throws together with the portion of the connecting rods that may be considered to rotate with the crankshaft $Mwa$ — Mass of balancing weight carried on shaft (40, 74)

$Mwb$ — Mass of balancing weight carried on shaft (34, 78)

$Mca$ — Mass of balancing weight toward one end of crankshaft $Mcb$ — Mass of balancing weight toward other end of crankshaft $Rwa$ — Radius from shaft centerline to center of gravity of balancing weight carried on shaft (40, 74)

$Rwb$ — Radius from shaft centerline to center of gravity of balancing weight carried on shaft (34, 78)

$Rca$ — Eccentricity of center of gravity of weight toward one end of crankshaft $Rcb$ — Eccentricity of center gravity of weight toward other end of crankshaft $Fwa$ — Centrifugal force developed by rotating balancing weight carried on shaft (40, 74)

$Fwb$ — Centrifugal force developed by rotating balancing weight carried on shaft (34, 78)

$Fca$ — Centrifugal force developed by rotating weight toward one end of carnkshaft $Fcb$ — Centrifugal force developed by rotating weight toward other end of crankshaft $a$ — Length along crankshaft from slide centerline to center of gravity of balancing weight at one end of crankshaft $b$ — Length along crankshaft from slide centerline to center of gravity of balancing weight at other end of crankshaft $W$ — Angular velocity of shafts 34, 40, 74, 78 and the crankshaft, which are seen to be positively coupled together to rotate at the same speeds The peak value of the primary inertia forces developed by the reciprocating slide assembly is given by:

$$Fs = Ms\ Rs\ W^2 \tag{1}$$

This force varies sinusoidally with crankshaft rotation, reaching its peak downward value at the time that the slide is at the bottom of its stroke and reaching its peak upward value at the time the slide is at the top of its stroke. It should be noted that this equation neglects the secondary inertia force that introduces a small balancing error for mechanisms employing connecting rods. In a practical case in a mechanical press the balancing error due to the secondary inertia force is small enough to be neglected, being of the order of approximately two to five percent in typical presses.

In addition to the reciprocating unbalance force the rotating unbalance force developed on the crankshaft is given by the following:

$$Fc = Mr\ Rs\ W^2 \tag{2}$$

The balance correction forces are given by the following relationships:

$$Fwa = Mwa\ Rwa\ W^2 \tag{3}$$

$$Fwb = Mwb\ Rwb\ W^2 \qquad (4)$$

$$Fca = Mca\ Rca\ W^2 \qquad (5)$$

$$Fcb = Mcb\ Rcb\ W^2 \qquad (6)$$

For the best balance correction using the mechanism of FIG. 1, the following relationships should apply:

$$Fwa = Fwb = Fs/2 \qquad (7)$$

$$Fca + Fcb = Fc \qquad (8)$$

$$a\ Fca = b\ Fcb \qquad (9)$$

Substituting equations (1) through (6) in equations (7) through (9) and eliminating $W^2$ yields the following relationships for proper balancing using the mechanism of FIG. 1:

$$2\ Mwa\ Rwa = Ms\ Rs \qquad (10)$$

$$a\ Mca\ Rca = b\ Mcb\ Rcb \qquad (11)$$

$$Mca\ Rca + Mcb\ Rcb = Mr\ Rs \qquad (12)$$

As can be seen from an examination of FIG. 1, rotation of shafts 34, 40 produces horizontal force components which, in FIG. 1, are equal and opposite so that the net effect of the balancing mechanism is to deliver an oscillating vertical force to the press frame to counteract the vertical slide inertia force. As the horizontal forces in FIG. 1 cancel one another at all times it can be seen that the two parallel balancer shafts 34, 40 may lie in any direction within a plane, as long as the direction of travel of the press slide 10 is perpendicular to the plane of shafts 34 and 40 and intersects that plane at a point of equal distance between the two balancer shafts.

In the alternate arrangement of the balancing system illustrated in FIG. 2, the balancer shafts 74 and 78 are gear driven from the press crankshaft 60 and, thus, rotate opposite to the crankshaft but both in the same direction. All three shafts 60, 74, 78 lie in the same plane and are parallel to one another.

The plane is perpendicular to the direction of travel of slide 66 and shafts 74 and 78 are equally spaced from crankshaft 60. This arrangement assures proper cancellation of horizontal force components without developing moments. The centers of gravity of the balancing weights on shafts 74 and 78 and of the press slide 66, determine a plane that is substantially perpendicular to all three shafts 60, 74, 78.

The inertia force relationships that prevail for the mechanism, FIG. 2, using the values marked thereon, are as follows:

Equation (1) above, defines the slide inertia force.

Equation (2) above, defines the rotating unbalance on the crankshaft.

Equation (3) above through (6) above, define the balance correction forces.

In place of equation (7) above, the following equation is applicable:

$$Fwa = Fwb = Fs/4 \qquad (13)$$

In place of equation (8) above, the following equation is applicable:

$$Fca + Fcb = Fs/2 + Fc \qquad (14)$$

Equation (9) above, remains valid to maintain moment balance.

Substituting equations (1) through (6) above, in equations (9), (13), and (14) yields the following relationships for proper balancing using the system of FIG. 2:

$$Mwa\ Rwa = Ms\ Rs/4 \qquad (15)$$

$$Mca\ Rca + Mcb\ Rcb = Rs\ (Ms/2 + Mr) \qquad (16)$$

Equation (11) above, remains valid for moment balance.

In the particular design illustrated in FIG. 2 the weight near one end of the crankshaft is shown integral with the gear that drives the gears on the balancing shafts, and is accomplished by boring holes through one side of the gear to displace the center of gravity of the gear away from the shaft centerline. An equivalent effect can be produced by bolting or otherwise fastening a weight to the gear, or by leaving the gear uniform and by adding weight at another location near the gear end of the shaft.

So long as the relationship expressed by equation (11) above is maintained, no tipping moment will be developed by the balancing weights on the crankshaft. So long as the relationship expressed by equations (15) and (16) above are maintained, the net balancing force will be correct on each shaft.

For both balancing mechanisms described, at the top and bottom dead center positions of the press slide, the forces developed by the rotating balance weights are equal and opposite to the primary slide inertia force together with the rotating unbalance. At the mid-stroke position where no primary slide inertia force is developed the rotating weight and rotating unbalance produce equal and opposite horizontal force components which cancel one another out without producing any net reaction tending to move the press structure.

The overall effect is that the only balancing errors in the system are due to ($a$) secondary inertia forces which are quite small with the large ratio of connecting rod length to crank throw eccentricity in a typical press, and (b) the error due to the die weight on the press slide not being identically equal to the value for which the balancing system was designed. This latter error may be made as small as desired by designing the press balancing system for the heaviest expected die weight and then by adding the necessary weight to the slide in each case so that the weight of the die in use, plus the added weight, is always equal to the design value. In practice, the die weight error to be expected in a given size press will usually not be sufficient to justify the added complication of this correction procedure.

FIGS. 7b and 7a are sectional views through the crown of a press and FIG. 8 is a vertical section through the press crown.

In these figures, the press crown is indicated at 90 and has rotatably mounted therein a crankshaft 92 supported on the main bearings 94 and having two throws 96 to which connecting rods 98 are connected. The crankshaft has an intermediate off center mass portion 100 sized and located to counterbalance the off center mass which rotates with the crankshaft.

At one end, the crankshaft rotatably supports a flywheel 102 driven by belt means 104 from a drive motor 106. Between flywheel 102 and crankshaft 92 and the crown of the press is a clutch-brake unit generally designated 108 and of a substantially conventional nature. The crankshaft also mounts a cog pulley 110 which drives a cog belt 112 leading upwardly and entrained about a further cog pulley 114 which is the same size of pulley 110.

Pulley 114 is mounted on a shaft 116 which has one extreme end mounted in bearing 118 while toward the other end the shaft extends into a frame 120 rigidly mounted on top of the press crown and within which frame are bearings 122 supporting shaft 116. On the opposite side of the frame from pulley 114 shaft 116 has a gear 124 which meshes with another gear 126 on another shaft 128 also journaled in frame 120.

Gears 124 and 126 are the same size so that shafts 116 and 128 rotate in unison but in respectively opposite directions. The shafts carry the counterweight members 130 and 132 respectively which are so oriented on the shafts that the centrifugal forces thereof combine to form a resultant force acting parallel to the direction of movement of the press slide and serving to counterbalance inertia forces developed by the reciprocating portions of the press structure.

Advantageously, shaft 116 mounts a braking disc 134 cooperating with caliper brake means 136 so that, whenever the crankshaft 92 is braked, the shaft 116 is also braked thereby relieving cog belt 112 of the substantial braking forces required to stop shafts 116 and 128.

As described earlier, the press controls are arranged together with rotary switches so that if the timing belt breaks the caliper disc brake 134 and 136 will quickly bring the balancing unit to a stop while the press crankshaft is stopped by its own clutch/brake unit. The disc brakes will also decrease the stopping time of the entire press.

A particular feature of the arrangement of FIGS. 7 and 8 is that the frame 120 with the shaft 116 and 128 and the counterweights 130 and 132 therein can be installed substantially as a unit on top of a press crown and connected with the crankshaft by the cog pulley and cog belt arrangement whereby the main portion of the press structure can remain substantially conventional. Such a unit could, for example, be supplied for existing presses, or supplied as a unit for incorporation in presses being built without requiring any major change in the press strucutre.

FIGS. 9 and 10 show an arrangement similar to that of FIGS. 7 and 8 and wherein, mounted on top of a press crown 150, is supporting frame means 152 in which are journaled the parallel shafts 154 and 156. Shaft 154 is adapted for being driven in synchronism with a crankshaft of the press as by the cog belt means generally designated at 158.

Each of shafts 156 and 154 carries a respective cogged timing pulley 160, 162 and there is entrained about these pulleys, and about an idler 163, a cog belt 164 with teeth on both sides of the belt as shown in FIG. 10, so that the shafts rotate in unison but in respectively opposite directions. Shaft 154 carries a counterweight 166 and shaft 156 carries a pair of counterweights 168 which together have the same mass and eccentricity as counterweight 166 but which are axially separated so that the counterweight 166 can pass therebetween thereby permitting shafts 154 and 156 to be fairly close together, thus, providing for a compact arrangement.

The crankshaft of the press is not shown in FIGS. 9 and 10, but it will be understood that the crankshaft preferably carries eccentric mass to counterbalance the eccentric mass which rotates with the crankshaft.

In the arrangement of FIG. 11, a frame 250 is provided adapted for being fixedly mounted on a press crown and having journaled therein a pair of parallel shafts 252 and 254. These shafts are interconnected by bevel gearing contained within the housings 256 and 258 and between which there extends a connecting shaft 260. The gearing and connecting shaft provide for rotation of shafts 252 and 254 in unison in respectively opposite directions.

Shaft 252 carried a counterweight 262 and shaft 254 carries a similar counterweight 264. Shaft 252 in FIG. 11 carries a cog pulley 266 at one end for positive driving connection of shaft 252 with the crankshaft of the press on which frame 250 is rigidly mounted.

The counterbalancing arrangements described heretofore all involve rotating counterweights distributed and arranged and driven in different manners and, in the main, effective for counterbalancing the reciprocating mass of the press. FIGS. 12 and 13 show modifications wherein the counterbalancing mass is guided and driven in such a manner as to be substantially reciprocable and along the same direction as the press slide.

In FIG. 12, for example, the press slide is indicated at 300 and is connected by connecting rod 302 with throw portion 304 of crankshaft 306 which is journaled in line bearings 308 in a press crown. Crankshaft 306 has another throw portion 310 directed oppositely to throw portion 304 and connected to throw portion 310 is a connecting link 312 which is pivoted at 314 to one end of a mass 316, the other end of which is pivoted on a stationary support as by pivot means 318.

In the FIG. 12 modification, the oscillating mass at 316 moves in the opposite direction to slide 300 and serves to counterbalance inertia forces developed by the slide while the pivot means at 318 absorb any horizontal forces developed by the oscillating mass. It will be understood in respect of the FIG. 12 arrangement that it would be preferable to have an oscillating mass 316 on each side of the throw 304 of the crankshaft to avoid developing undesirable moments on the crankshaft.

In FIG. 13, an arrangement similar to that of FIG. 12 is illustrated and the same reference numerals are applied where applicable. In FIG. 13, however, the connecting link 312 is connected to a mass 320 which is connected to one end of a strip-like flexible guide member 322, the other end of which is stationarily clamped as at 324.

In FIG. 13 modification, mass 320 reciprocates in unison with the slide, but in the opposite direction thereto and develops inertia forces directly opposed to those developed by the slide. The flexible element 322 may be, for example, spring steel or the like and is provided for the purpose of preventing lateral movement of mass 320 as it reciprocates.

FIG. 14 schematically illustrates a counterbalancing arrangement in which a crankshaft 350 is rotatably journaled in a frame 352 and has a throw 354 to which is connected the lower end of a connecting rod 356. The upper end of the connecting rod 356 is connected to a load plunger 358. Plunger 358 is guided in a sleeve-like portion 360 forming a part of the frame.

Crankshaft 350 has two further throws 362 thereon on opposite sides of throw 354 to which the lower ends of connecting links 364 are connected, the upper ends of which are pivotally connected to a mass member 366 guided for movement parallel to load plunger 358 as, for example, by being guided on the outside of sleeve-like portion 360 of frame 352.

The arrangement of FIG. 14, by selecting the proper size for counterweight 366, effectively balances the parts driven in reciprocation by the rotation of crankshaft 350, namely, the load plunger 358 and the parts driven thereby.

In the case of any of the crankshafts of FIGS. 12 and 13, the additional throws, or eccentrics, provided on the crankshaft for actuating the counterweight mechanism can be so selected as to size and eccentricity as substantially to balance any rotating forces of unbalance created in the crankshaft by the rotation thereof.

What is claimed is:

1. Dynamic balancing means for a press having a frame and a single crankshaft rotatable in said frame, and flywheel means also rotatable in the press frame and adapted for being drivingly connected to the crankshaft, said crankshaft having throw means, slide means reciprocably guided in said frame and means connecting said slide means to said throw means whereby rotation of said crankshaft will cause said slide means to reciprocate in said press frame; said balancing means being operable for counterbalancing inertia forces acting on said press frame and created by reciprocation of said slide means, said balancing means comprising mass means in force transmitting relation to said press frame and at least in part mounted in said frame separately from said crankshaft, and drive means drivingly connecting said crankshaft to said mass means to drive said mass means in unison with said crankshaft, said mass means being driven in a direction such that the inertia forces developed on the press frame thereby parallel to the direction of reciprocation of said slide means act in a direction opposite to the direction in which the inertia forces developed by the slide means act on the press frame.

2. Dynamic balancing means according to claim 1 in which said mass means comprises rotatable eccentric mass means, shaft means rotatably supported on the press frame and fixed to and supporting said mass means, and said drive means comprising positive drive means drivingly connecting said crankshaft to said shaft means for rotation of said shaft means at the same speed as said crankshaft.

3. Dynamic balancing means according to claim 1 in which said mass means comprise rotatable eccentric masses fixed to and supported on a pair of respective shafts, said shafts being rotatably supported on said press frame, and said drive means comprising positive drive means drivingly connecting said crankshaft to said shafts for rotation of said shafts at the same speed as said crankshaft.

4. Dynamic balancing means according to claim 3 which includes means drivingly interconnecting said shafts for rotation in unison in respectively opposite directions, said drive means connecting one of said shafts to said crankshaft.

5. Dynamic balancing means according to claim 3 which includes frame means in which said shafts are journaled, said frame and the said shafts therein forming a circuit adapted for means being mounted on said press frame.

6. Dynamic balancing means according to claim 4 in which said drive means includes cogged pulley means of equal size on said crankshaft and on said one shaft, and a cog belt entrained about said pulleys.

7. Dynamic balancing means according to claim 6 which includes rotary switch means arranged to detect a discrepancy between the angular positions of said balancing means and said crankshaft, said switch means being adapted to stop said press in response to said position discrepancy.

8. Dynamic balancing means according to claim 3 in which said eccentric masses comprise a single mass on one shaft and a pair of masses on the other shaft, said pair of masses being axially offset from said single mass, the masses on said shafts radially overlapping during rotation of said shafts.

9. Dynamic balancing means according to claim 3 in which said shafts are disposed on opposite sides of said crankshaft, a first gear on said crankshaft, and further gears the same size as said first gear meshing with the first gear and mounted on said shafts.

10. Dynamic balancing means according to claim 1 in which said mass means is guided for movement in a direction substantially parallel to said slide means, said crankshaft comprising eccentric means oriented thereon oppositely to said throw means, and link means connecting said eccentric means to said mass means and substantially parallel to the direction of reciprocation of said slide means.

11. Dynamic balancing means according to claim 10 in which said mass means is in the form of arm means, pivot means pivotally supporting one end of said arm means, said link means being connected to said arm means in a region spaced from said pivot means.

12. Dynamic balancing means according to claim 10 which includes flexible strip means having one end stationarily supported and the other end connected to said mass means.

13. Dynamic balancing means according to claim 3 which includes means drivingly interconnecting said shafts and said crankshaft for rotation in unison such that said shafts rotate in the same direction as one another but in a direction opposite to that of said crankshaft.

* * * * *

UNITED STATES PATENT OFFICE
CERTIFICATE OF CORRECTION

Patent No. 3,808,912          Dated May 7, 1974

Inventor(s) John E. Voorhees and Robert L. Schockman

It is certified that error appears in the above-identified patent and that said Letters Patent are hereby corrected as shown below:

Col. 4, line 63, "6°" should be --- 60° ---.

Col. 5, line 21, "frane" should be --- frame ---.

Col. 12, line 25, (Claim 5) "means" omitted between "frame" and "and".

Col. 12, line 26, (Claim 5) "means" after "for" should be deleted.

Signed and sealed this 24th day of September 1974.

(SEAL)
Attest:

McCOY M. GIBSON JR.          C. MARSHALL DANN
Attesting Officer            Commissioner of Patents